G. W. UPTON.
FISHING REEL.
APPLICATION FILED JAN. 18, 1918.

1,402,811. Patented Jan. 10, 1922.

Inventor,
George W. Upton

UNITED STATES PATENT OFFICE.

GEORGE W. UPTON, OF WARREN, OHIO.

FISHING REEL.

1,402,811.  Specification of Letters Patent.  Patented Jan. 10, 1922.

Application filed January 18, 1918. Serial No. 212,425.

*To all whom it may concern:*

Be it known that I, GEORGE W. UPTON, a citizen of the United States of America, residing at Warren, in the county of Trumbull and State of Ohio, have invented certain new and useful Improvements in Fishing Reels, of which the following is a specification.

This invention relates to improvements in fishing reels, and its objects are; first, to release or free the spool from operation with the gears when the line is unwinding from it, and re-connect it with the operating gears when the crank is turned for winding the line in: second, to connect a rotatable shaft, having reverse threads and operating a line distributing, mechanical, thumbing block, with the gears of the reel when the line is winding in, and disconnect it, making it inoperative when the line is unwinding from the spool, and third, to provide a simple clutch for use with any rotating mechanism which will be mechanically operated to engage its clutch members when revolved in one direction and disengage themselves when revolved in the opposite direction.

I attain those objects by the mechanism illustrated in the accompanying drawings, in which—

Like characters refer to similar parts throughout the several views.

Figure 1:
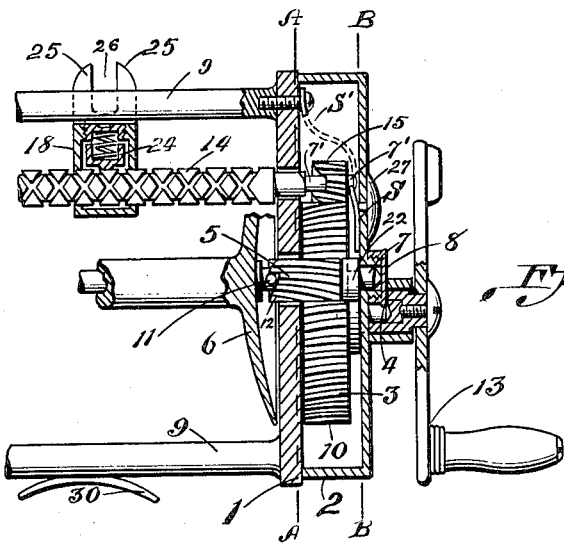
Figure 1 is an elevation showing one end of a fishing reel with my invention applied, with parts broken away and partly in section.

The right end plate of a reel called a head plate, 1, carries the usual cap 2, enclosing the gears which in this instance consist of a cog 3, mounted on a cog post 4, whose base is riveted to the head plate, 1, in the usual way.

The spool, 6, revolves on an axle, 7, one of whose protruding ends is shown contacting at its extreme outer, pointed end with the center of an oil cup, 8, which is threaded onto a protuberance on the exterior of the cap 2 in the usual way.

The head plate 1 is connected with the tail plate of the reel (not shown) by a plurality of pillars 9, 9, to two of which a reel seat cross plate 30, is attached as usual.

The cog, 3 I manufacture with generated spirally cut gear teeth, 10, cut on very moderately inclined helical planes, respectively parallel, and having their inner ends lower than their outer ends, as illustrated, when viewed from the front of a right hand winding reel. Seen from the rear the line of their slope would be reversed of necessity.

Correspondingly I manufacture the pinion 5, which is sleeved loosely on the axle 7, with spirally cut teeth of a corresponding pitch and number, but reversed as to their helical angle or inclination so as to properly mesh with the teeth on the cog 3, and as clearly shown in Fig. 1.

I have shown a clutch mechanism for the pinion and axle 7 comprising a peg 11 through the axle 7 for one member, and a plurality of engaging slots, 12, cut longitudinally into one end of the pinion 5, which members serve to clutch and cause the spool 6 to rotate toward the operator, to wind in the line, when the cog 3 is rotated by means of the crank 13 in the opposite or forward direction.

The clutch mechanism hereinabove described is subject matter of my earlier Patent No. 820,326, to which such reference is made as is pertinent.

In connection with the class of reels which have doubly cut or reversely threaded rotating rods between their head and tail plates, for operation in conjunction with pawls traveling in said threads on said rods, one of which is illustrated (broken away) as rod 14, bearing a line distributing block 18, I provide a pinion 15, loosely sleeved on an end of said rod 14, which protrudes through the head plate 1, and into the casing space under the cap 2, meshing with the cog 3, as shown.

I manufacture the pinion 15 with spirally generated teeth of the same pitch as those shown and described as for the pinion 5, and of a number required by the relative diameters of the cog 3 and pinion 15, and helically inclined in reverse of the teeth of cog 3, as clearly shown.

Figure 4:
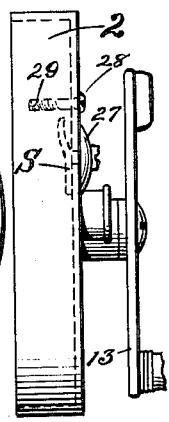
Fig. 4 shows my preferred form of novel and useful clutch members pertaining to this invention, in perspective in which the upper pair of illustrations, $4^a$ and $4^{a\prime}$ show my clutch members as at first made up and in operative condition for ordinary use; and the lower pair $4^b$ and $4^{b\prime}$ show the same, after a modification, for more prompt engagement with each other.
Figure 4:
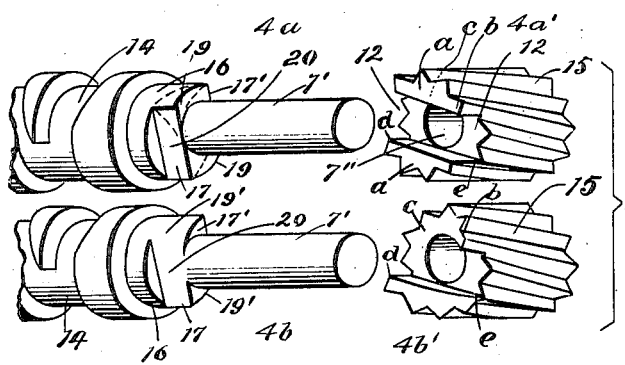

The pinion 15 can be used to clutch the rod 14 by employing the same clutch members 11, and 12 as are shown for pinion 5; but, in order to avoid weakening the end of the shaft 14 (or the axle 7) by drilling a hole for a peg (as 11), and, to produce a clutch which shall have a minimum of frictional contact, and rapping of adjacent members when the members are out of clutch, one being idle and the other rotating, as when the rod 14 or the axle 7 is cast free from the rotations of the gears, I have invented and prefer the form of a simple clutch illustrated in Fig. 4, in which I show the end of a reverse threaded rod 14 (broken away) with a slight annular reduction to produce a collar 16 which conveniently (but not of necessity) fits into a hole or a bushing set into a hole in the head plate 1, for a bearing.

In practice (when used as an axle) said reduced collar extends far enough to admit of two opposite parallel flat surfaces 17, 17' being chamfered, and then a corresponding rectangular cut out (12, 12) Fig. 4, is made in one end of a pinion 15' leaving legs $a, a$, Fig. 4, so the pinion straddles the axle, clamping the pinion legs $a, a$, onto the surfaces 17, 17'; the central hole 7" through the pinion, fitting snugly on the reduced extension 7' (or 7) and revolving with it.

To form my improved clutch I cut off two opposite corners 19, 19 of the chamfered lug 20 in such a way as to leave two lanceolated surfaces 19', 19' where the corners 19, 19 were, as clearly illustrated in Fig. 4.

I then cut the opposite legs $a, a$, on opposite bevels from $b$ down to $c$, and from $d$ down to $e$, as shown in Fig. 4. In consequence, when the pinion 15 is pushed up to the lug 20 the beveled legs $b, c$ and $d, e$, slide over and around on the lanceolated surfaces 19', 19' and lock the pinion and rod or axle end in clutch.

Vice versa, when the pinion is rotated the other way it slides and rolls off of the lug 20, and the rod 14 (or the axle end 7 when there used) is freed from the gears.

I manufacture the cogs and pinions with spiral gears cut as described and illustrated because by so doing rotation of the cog 3 in a forward direction drives the pinions 5 and 15 inwardly along the ends 7 and 7' on which they are sleeved, respectively, (or either of them if but one is used) by virtue of the frictional conversion of vertical pressure to lateral movement along the spiral gear teeth.

The harder a large fish pulls on the line wound on the spool the more firmly does the pinion 5 drive in onto the peg 11, to hold its clutch relation.

In reverse, when the crank is not held the casting of a bait on the end of the coiled line swiftly rotates the spool forward releasing the clutch members and driving the pinion 5, outwardly toward the oil cup 8, allowing the spool to spin freely.

When it is not desired to free the spool in casting, an annular washer 22 is put on the axle 7 between the pinion 5 and the cap 2.

Then the cast releases the clutch on the end of the rod 14; allows the pinion 15 to spin freely with practically no friction to shorten the cast, and leaves the line distributing block 18 at rest until the crank 13 is grasped and rotated to wind in the line, whereupon the clutch members of the pinion 15 and the rod 14 at once engage, the rod 14 is rotated, the pawl 24 retained in very slight frictional contact with the rod 14 travels in its reversing threads, and the block 18 moves laterally of the reel along the rod 14 evenly distributing the incoming line, which it has automatically picked up by crowding it over the prongs 25, 25 at its ends and dropped into the slot 26, on the spool 6.

Figure 3:
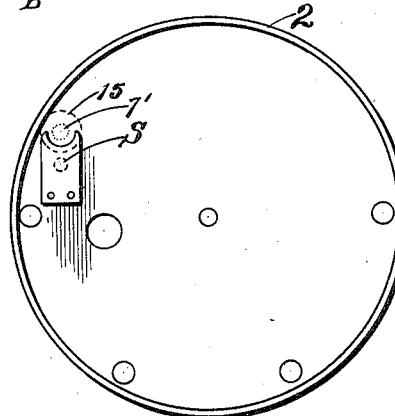
Fig. 3 shows on the left a view of the interior of the cap of my reel, taken on the line B—B, Fig. 1, and looking to the right; and a side view of the reel cap on the right of the figure.

The operation of the spirally generated gear teeth on the cog and pinion is ordinarily sufficient to force the pinion into and out of clutch with an axle or rotating rod or shaft, but to make the prompt operation more positive, as in cases of faulty lubrication or the lack thereof, a very light spring may be used to start the pinion inwardly along the axle or rod end, and I have illustrated a preferred form in Figs. 1 and 3, in the flat spring S attached to the under or inside face of the reel cap 2 and having prongs (or a hole) at its free end to clear the end 7' of the rod 14. As the free end of the spring, S, lightly bears only upon the outer end of the pinion 15, and does not touch the outer end of the rod 14, which end rests between the prongs of the spring S (or passes through a hole therein, when so constructed, not shown as it is only a mechanical equivalent) the pinion 15 moves freely upon the rod 14, and touches the spring only when it is out of operative clutch with the rod 14. In case the longitudinal drive of the pinion inwardly is not sufficiently or quickly enough effected by the pressure on its spirally cut teeth, of those of the cog, the spring S will shoot the pinion inwardly only just enough to cause the ends of the clutch members to take hold; whereupon the spring no longer functions and the gears firmly seat and hold the clutch members together. The harder the pull of a fish the firmer will be the clutch hold.

The spring will usually be so adjusted as not to touch the pinion and will not function, (leaving the invention self-operating) to avoid a slight friction between the extremes of the clutch members in passing each other as the pinion revolves and the rod rests idle when the cast is made. The spring is adjusted so that it but starts the pinion inward, but ordinarily does not press it heavily after the clutch members have united.

One reason why I prefer this form is because it can be regulated from the outside of a reel by use of an ordinary slide button such as is in common use to put "drags" of reels in operation, as illustrated by button 27.

Figure 2:
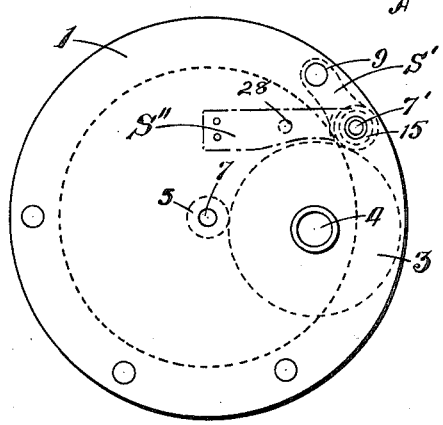
Fig. 2 shows a plan view of the same taken through line A—A looking inward or toward the left.

I have shown, in dotted line, a spring S' Fig. 2, attached to the end of a pillar 9 and held by its pillar screw; and another one in broken line, S", holding the pinion 15 in clutch with the rod 14 and adjustable by a screw 28 whose threaded stem, 29, pierces it and whose head is outside of the reel cap 2.

The use of a light, spirally coiled spring, surrounding an axle or a rod end, either within a cavity of the pinion or at either end of it, is equally within the scope of my invention.

I do not limit the use of the described clutch to fishing reels.

I claim:

1. The combination of a complete fishing reel having a spirally cut cog and pinion, a reverse threaded rotatable rod between its end plates and extending at one end into the gear case, a loosely sleeved line guide block containing a pawl and spring mounted on said rod, and a clutch member formed as part of said rod within said gear case, with a sliding sleeved pinion one of whose ends forms the second member of a clutch and having spirally generated gear teeth meshing with the teeth of said cog and a spring attached at one end to a rigid part of said reel and having its free end in contact with said pinion.

2. In a fishing reel of the kind described, the combination of a frame, a spool, a crank, a cog and a rotatable rod in front of said spool; with a pinion in mesh with said cog, and a spring attached to said frame at one end, and contacting with said pinion when it is not in operating relation to said rotatable rod, for the purpose set forth.

3. In a fishing reel, a frame, a main shaft, a spool mounted thereon, a level wind shaft, a line-laying device mounted upon said level-wind shaft and adapted to be moved thereby, spirally toothed pinions or cogs sleeved upon the inner ends of said main and level-wind shafts, adapted to operatively engage said spool and level-wind shaft when moved laterally inward, and a manually operated spirally toothed gear in mesh with said cogs to simultaneously shift them laterally during their rotation in one direction or the other.

In testimony whereof I affix my signature in the presence of two witnesses.

GEORGE W. UPTON.

Witnesses:
H. T. UPTON,
E. J. HAUSER.